United States Patent [19]

Larson et al.

[11] 4,320,421
[45] Mar. 16, 1982

[54] ROTARY ACTUATOR FOR FILE PROTECT FUNCTION

[75] Inventors: Richard T. Larson, Boulder; David H. McMurtry; Helfried O. Rinkleib, both of Tucson, all of Ariz.

[73] Assignee: International Business Machines Corporation, Armonk, N.Y.

[21] Appl. No.: 153,801

[22] Filed: May 27, 1980

[51] Int. Cl.³ .................... G11B 15/04; G11B 23/02
[52] U.S. Cl. ...................................... 360/60; 360/132
[58] Field of Search ................ 360/60, 62, 137, 132

[56] References Cited
U.S. PATENT DOCUMENTS 3,692,956 9/1972 Northrup ........................... 360/60
3,950,786 4/1976 Shapley ............................ 360/132
4,003,088 1/1977 Schwartz .......................... 360/60

Primary Examiner—Vincent P. Canney
Attorney, Agent, or Firm—Walter J. Madden, Jr.

[57] ABSTRACT

Structure for providing a file protect function for a removable cartridge which houses a magnetic recording medium includes a rotary actuator in a sleeve member, the actuator having an outer disk and an inner disk. The actuator may be rotated in the sleeve to either of two positions 180° apart by application of force to the outer disk. The inner disk has an interrupted segment therein, and the rotational position of this interrupted segment controls the enabling or disabling of the circuitry for recording on the magnetic medium.

4 Claims, 8 Drawing Figures

ROTARY ACTUATOR FOR FILE PROTECT FUNCTION

TECHNICAL FIELD OF THE INVENTION

This invention relates to devices for preventing inadvertent recording on magnetic recording members. Features disclosed, but not claimed herein, are claimed in copending application Ser. No. 153,802, filed May 27, 1980, assigned to the same assignee as the present application.

BACKGROUND ART

In magnetic recording, and particularly in the case of portable magnetic recording devices such as a cartridge containing magnetic recording tape, it is important to provide measures to prevent inadvertent recording on the magnetic medium. This function, commmonly known as "file protect", is necessary to avoid accidental erasure of information already recorded on the medium and not intended to be replaced by recording over it. When enabled, the file protect function effectively disables the recording or writing circuitry of the device with which the medium is being used so as to prevent operation of the writing circuitry so long as the file protect feature is in operation.

PRIOR ART

A number of approaches have been employed in the past to provide a file protect function.

U.S. Pat. No. 3,692,956

This patent discloses a sealed magnetic tape casette consisting of a supply reel and a take-up reel positioned in side by side relationship, with a length of magnetic recording tape interconnecting the reels. A tape threading path consisting of guides, a magnetic transducer and tape sensing means for sensing the presence of tape in the tape path is disclosed. Writing on the tape is controlled by an infrared light source, a light sensitive sensor and a rotatable disk. The disk has a hole which allows the transmission of light and a slot for rotating the disk. When the disk is rotated so that light from the infrared light source impinges on the light sensitive sensor, writing on the tape is allowed. Conversely, when the disk is rotated so that light does not impinge on the sensor, writing on the tape is not allowed.

U.S. Pat. No. 4,003,088

This patent discloses apparatus for writing and/or reading data from a selected side of a floppy disk encased within a protective envelope. A pair of spaced holes are provided on a common radius of the envelope. A single hole is provided in the disk and aligned with one of the spaced holes once per disk revolution. Each of the holes in the envelope generates the write enable function for one side of the disk. A light emitting/light receiving means is mounted on a tape deck which co-acts with the disk to read and/or write data thereon. A movable shutter mechanism is associated with the envelope so that the light beam emanating from the light source through one of the holes in the disk and envelope is either blocked or is allowed to impinge on the light receiving means. The write/read function is enabled for one of the sides of the disk when light is allowed to pass through one of the holes.

U.S. Pat. No. 3,950,786

This patent discloses a magnetic tape cassette employing a sliding door to enable or inhibit recording on the tape. A cavity is provided in the rear wall of the cassette for receiving a cavity sensing mechanism, and the position of the sliding door relative to the cavity determines whether the cavity is sensed by the sensing mechanism to permit or prevent recording on the tape.

THE INVENTION

In accordance with the present invention, structure providing the file protect function is employed which is reliable, sturdy, economical to manufacture and which does not aggravate any problem of contamination of the magnetic recording medium. The structure preferably includes a rotary file protect actuator having a plurality of disks thereon mounted on a common shaft. One of the disks has an interrupted segment therein and the position of this disk determines whether the file protect feature is enabled or disabled.

In one embodiment, rotation of the shaft causes either the interruption or transmission of a light beam from a light source to a photosensitive device. The photosensitive device in turn either prevents or allows the writing of information onto the medium, depending upon the position of the disk. The light source and photosensitive device may be located at the tape deck extending into the cartridge such that the file protect disk is positioned between the light source and the photosensitive device. The shaft can be rotated by a groove formed in a disk at the outer surface of the cartridge. The outer disk may also include an indicator that provides a visual indication of the orientation of the file protect disk. Means can be provided to hold the file protect disk in either of the two 180° displaced rotational positions. As an alternate to the use of optical means for sensing the position of the file protect disk, mechanical means such as a spring-loaded plunger adjacent the disk structure may be employed, the position of the plunger being determined by whether the interrupted or uninterrupted portion of the disk is positioned adjacent thereto.

The file protect rotary actuator is mounted inside a sleeve member which is preferably made an integral part of the cartridge or other housing which holds the recording medium. In one embodiment, the sleeve member has a pair of slots disposed on opposite sides thereof, the slots extending the length of the sleeve. The rotary actuator includes an outer disk having two projections thereon spaced 180° from each other.

The file protect actuator is inserted into the sleeve with the projections fitting into the slots such that two locking positions are identified 180° apart from each other. At one position, when the projections are in alignment with the slots, the file protect actuator permits a write operation, and at the second position 180° displaced from the first, the file protect device prevents writing of data on the recording medium. At intervening rotational positions of the outer disk, the slotted sleeve will flex. This flexing provides a force against rotation of the actuator to prevent accidental rotation of the actuator and requiring a deliberate action to change the actuator position. In the preferred embodiment, the edge of the sleeve immediately adjacent the cartridge wall is lower in height than the portion of the sleeve to the rear of the slots away from the cartridge wall, so that only one of the projections contacts the sleeve during rotation of the actuator.

DESCRIPTION OF THE DRAWING

FIG. 5b is a perspective view of a sleeve member for use with the rotary actuator of FIG. 5a.

DESCRIPTION OF THE BEST MODE AND INDUSTRIAL APPLICABILITY

Figure 1:
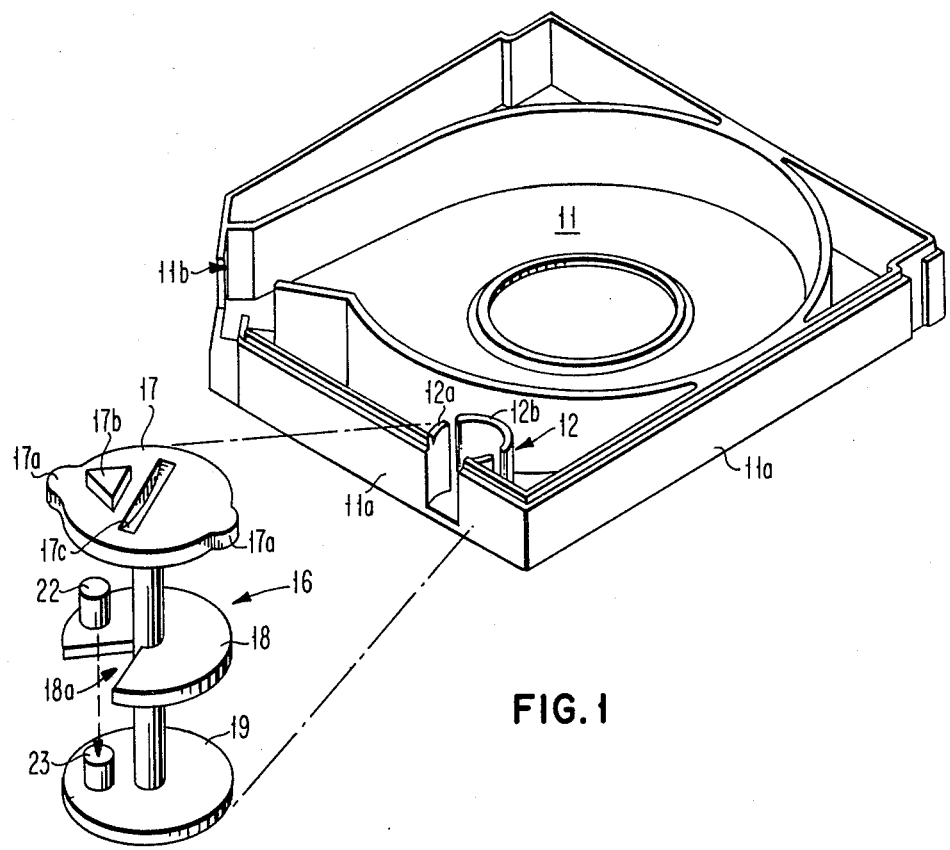
FIG. 1 is a perspective view of a cartridge for holding a magnetic medium and provided with a file protect device in accordance with the present invention.

FIG. 1 illustrates a cartridge member 11 in which the present invention may be employed. Cartridge member 11 is adapted to house a magnetic recording member such as a reel of magnetic tape (not shown), one end of the recording member being withdrawn from cartridge 11 through an opening 11b. It will be understood that after the magnetic recording member is placed in cartridge 11, a top cover (not shown) will be provided to form essentially a contamination free enclosure for the record member.

Figure 2:
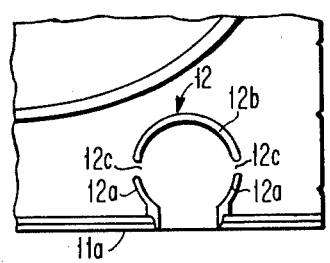
FIG. 2 is a plan view on an enlarged scale of the sleeve member which is the file protect device of FIG. 1.
Figure 3:
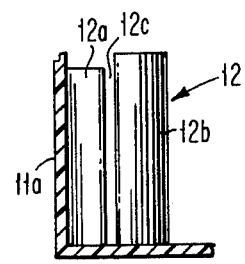
FIG. 3 is an elevation view of this sleeve member.

A sleeve member in accordance with the present invention, is indicated as 12 in FIG. 1 and is shown in plan and elevation views in FIGS. 2 and 3. Sleeve 12 is preferably molded as an integral part of cartridge wall 11a, and includes two extending portions 12a which are spaced from a curved portion 12b to form a pair of slots 12c in sleeve 12 spaced 180° from each other.

Figures 4A, 4B, 6:
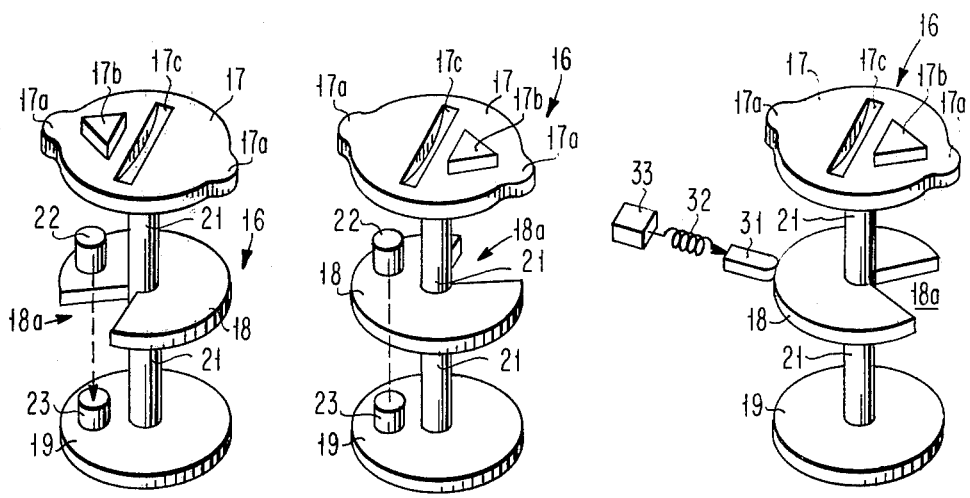
FIGS. 4a and 4b are perspective views of one embodiment of a rotary file protect actuator, showing rotational positions of the actuator which are 180° apart.
FIG. 6 is a perspective view of a file protect actuator structure using mechanical means to sense the actuator position.

Sleeve 12 coacts with a file protect rotary actuator 16 shown in exploded form in FIG. 1 and in greater detail in perspective in FIGS. 4a and 4b. Rotary actuator 16 includes an outer disk 17, a center or middle disk 18 and an inner disk 19, all mounted on a common shaft. Outer disk 17 is provided with two projections 17a thereon spaced 180° apart. Disk 17 also includes an indicator 17b which provides an indication of the position of the file protect actuator, and a groove 17c into which a screwdriver or other device may be inserted to rotate the file protect actuator.

Center disk 18 includes an interrupted portion or segment 18a. In operation, disk 18 is operable to either interrupt or transmit light from a light source 22 to a light sensor 23 to control the file protect function. Source 22 and sensor 23 are preferably mounted on the tape deck (not shown) in which cartridge 11 is mounted and occupy the positions relative to disk 18 shown in FIGS. 4a and 4b. In the position shown in FIG. 4a, the interrupted segment 18a is aligned with source 22 and sensor 23 so that light from source 22 may be transmitted to sensor 23. In the position shown in FIG. 4b, which represents a 180° rotation from the position of FIG. 4a, disk 18 prevents transmission of light from source 22 to sensor 23. The output of sensor 23 is used to enable or disable the circuits for recording on the magnetic medium in cartridge 11. Lower disk 19 is provided primarily to give support to the actuator when positioned in sleeve 12.

File protect actuator 16 is inserted into sleeve 12 with projections 17a fitting into slots 12c so that two locking positions are identified 180° apart from each other. At one position, the file protect actuator permits a write operation and at the second position, displaced 180° of rotation from the first, the file protect device prevents writing of data on the record member. During other rotational positions of upper disk 17, slotted sleeve 12 will flex. This flexing provides a force against rotation of actuator 16, to prevent accidental rotation by requiring a deliberate action to change the actuator position. In the preferred embodiment, as best shown in FIG. 3, the portions 12a of sleeve 12 immediately adjacent the cartridge wall 11a are lower in height than the portion 12b of the sleeve to the rear of the slots 12c away from the cartridge wall, so that only one of projections 17a contacts sleeve 12 during rotation of the actuator.

Figure 5A:
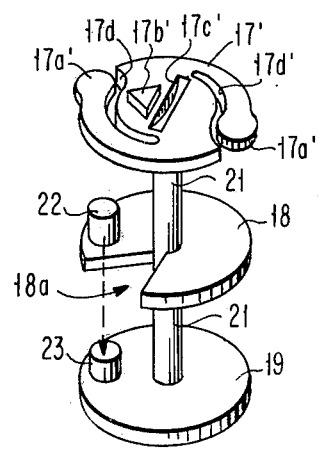
FIG. 5a is a perspective view of an alternate embodiment of a rotary file protect actuator.
Figure 5B:
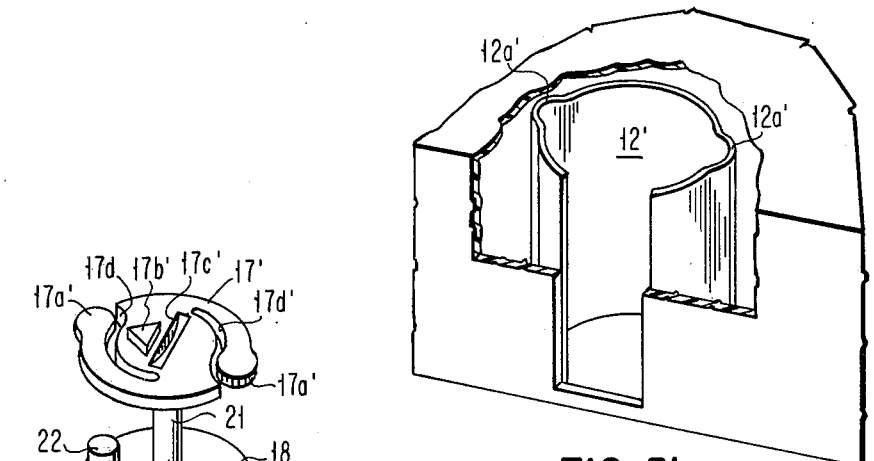

FIGS. 5a and 5b illustrate an alternate embodiment of the invention in which upper disk 17' has projections 17a' which are flexible relative to the disk by virtue of grooves 17d' cut therein as shown in FIG. 5a. Inner disk 18 and lower disk 19 may be essentially the same as shown in FIG. 4a, disk 18 having the interrupted segment 18a as before to control the passage of light of a mechanical element and hence effect the file protect function.

The file protect rotary actuator shown in FIG. 5a coacts with the sleeve member 12' in FIG. 5b. Sleeve 12' does not have slots therein, but has two diametrically opposed extensions 12a' which receive the projections 17a' of disk 17'. When the actuator is rotated by application of force to groove 17c', flexible extensions 17a' flex to permit rotation of the actuator while still providing sufficient resistance to prevent inadvertent rotation of the actuator. As in the embodiment of FIG. 4, in one position in which projections 17a' engage extensions 12a' of sleeve 12', the interrupted segment 18a of disk 18 is positioned to allow transmission of light from source 22 to sensor 23 for controlling the file protect function. In the rotated position 180° from that shown in FIG. 5a, interrupted segment 18a has moved so that disk 18 blocks light from sorce 22 to sensor 23, thus inhibiting writing on the magnetic record medium in cartridge 11.

FIG. 6 illustrates an alternate embodiment of the invention employing a mechanical element to sense the position of the file protect actuator. The actuator 16 may be that shown in FIGS. 4a and 4b including outer disk 17, inner disk 18 having interrupted segment 18a, and lower disk 19. A mechanical element such as a plunger 31 is urged toward and bears against the periphery of disk 18 by a spring 32 when in the position shown in FIG. 6. When the actuator is rotated 180°, interrupted segment 18a of disk 18 is positioned adjacent plunger 31, and the force of spring 32 forces plunger 31 into opening 18a to thereby operate a limit switch 33. Switch 33 is connected to control the circuitry for recording on the magnetic medium in a manner similar to that of sensor 23 in FIGS. 4a and 4b. Thus, the recording circuitry may be enabled or disabled, depending on the position of actuator 16, to provide the file protect function.

It will be understood that although the illustrated embodiments show the inner disk 18 having an interrupted portion 18a for controlling the file protect function, it will be apparent that either outer disk 17 or lower disk 19 could be provided with an interrupted portion to control this function.

It will be apparent that the structure of this invention is such that even if an operator should inadvertently not fully rotate the disk to one of the 180° detent positions, the photocell structure will not be damaged. Additionally, although the illustrated embodiment shows detent projections 17a on the outer disk 17, it will be evident that such projections could be provided on either disk 18 or 19, or on all of disks 17, 18 and 19.

Thus, it will be seen that the present invention provides a simple, economical and reliable means to implement a file protect function in a cartridge member carrying a magnetic recording medium, to prevent inadvertent recording on the medium.

We claim:

1. A file protect device for controlling recording on a magnetic recording medium stored in a cartridge, by interfacing with sensing means located in a housing in which said cartridge is mounted, said file protect device comprising a shaft;

means for rotatably mounting said shaft within said cartridge;

a file protect disk mounted on said shaft and in operative relationship with said sensing means, said disk having an interrupted segment therein, and means for rotating said shaft to move said interrupted segment relative to said sensing means, whereby said sensing means detects the position of said interrupted segment to effect a file protect function;

said sensing means including a mechanical element which is urged against the periphery of said disk, whereby said mechanical element enters said interrupted segments when said shaft is rotated to position said segment adjacent said mechanical element, including means responsive to the position of said mechanical element to effect a file protect function.

2. Apparatus in accordance with claim 1, including means on said shaft for indicating the rotational position of said file protect disk to indicate the status of the file protect function.

3. A file protect device for controlling recording on a magnetic recording medium stored in a cartridge, by interfacing with sensing means located in a housing in which said cartridge is mounted, said file protect device comprising a shaft;

means for rotatably mounting said shaft within said cartridge;

a file protect disk mounted on said shaft and in operative relationship with said sensing means, said disk having an interrupted segment therein;

means for rotating said shaft to move said interrupted segment relative to said sensing means, whereby said sensing means detects the position of said interrupted segment to effect a file protect function;

an outer disk mounted on said shaft and rotatable therewith, and said outer disk having a groove therein for applying rotational force to said outer disk, said shaft and said file protect disk.

4. Apparatus in accordance with claim 3, in which said outer disk has a pair of slits therein to make said outer disk resilient, and a sleeve member in said cartridge surrounding said outer disk and engaging the periphery of said outer disk to control the position of said outer disk and said file protect disk.

* * * * *